United States Patent
Jackson

(10) Patent No.: US 7,270,376 B2
(45) Date of Patent: Sep. 18, 2007

(54) ENHANCED PROCESS FOR MAKING SEATING ELEMENTS AND PRODUCTS THEREBY INCLUDING THOSE SPECIALLY DESIGNED FOR CHILDREN

(75) Inventor: Donna Jackson, Fort Worth, TX (US)

(73) Assignee: NuBax Limited, Chessington, Surrey (GB)

( * ) Notice: Subject to any disclaimer, the term of this patent is extended or adjusted under 35 U.S.C. 154(b) by 0 days.

(21) Appl. No.: 11/149,806

(22) Filed: Jun. 10, 2005

(65) Prior Publication Data

US 2005/0275274 A1    Dec. 15, 2005

Related U.S. Application Data

(60) Provisional application No. 60/579,134, filed on Jun. 11, 2004.

(30) Foreign Application Priority Data

Nov. 22, 2004    (GB) .................................. 0425646.7

(51) Int. Cl.
*A47C 7/02*    (2006.01)
(52) U.S. Cl. ................ 297/452.24; 5/653; 297/452.21; 297/452.23
(58) Field of Classification Search ............ 297/445.1, 297/452.21, 452.22, 452.23, 452.28, 452.24; 5/652, 653
See application file for complete search history.

(56) References Cited

U.S. PATENT DOCUMENTS

| 1,961,641 | A | * | 6/1934 | Ollis ..................... 297/452.25 |
| 2,156,629 | A | * | 5/1939 | Hutchison ...................... 5/652 |
| 2,970,638 | A | * | 2/1961 | Halter ................... 297/452.25 |
| 3,000,020 | A |   | 9/1961 | Lombard et al. |
| 3,503,649 | A | * | 3/1970 | Johnson ................. 297/452.26 |
| 3,612,607 | A |   | 10/1971 | Lohr |
| 3,833,259 | A |   | 9/1974 | Pershing |
| 3,833,260 | A |   | 9/1974 | Harder, Jr. |
| 4,027,843 | A |   | 6/1977 | Thompson |
| 4,522,447 | A | * | 6/1985 | Snyder et al. ................. 5/653 |
| 4,572,578 | A |   | 2/1986 | Perkins |
| 4,673,216 | A |   | 6/1987 | Alfer |
| 4,696,516 | A |   | 9/1987 | Yeum |

(Continued)

FOREIGN PATENT DOCUMENTS

EP            1 330 973 A2    7/2003

OTHER PUBLICATIONS

Telegraph Motoring, "The Lotus Position", Oct. 1, 2005.

(Continued)

*Primary Examiner*—Peter R. Brown
(74) *Attorney, Agent, or Firm*—Peter J. Gluck; Greenberg Traurig LLP

(57) ABSTRACT

By combining a wedged cushion and specialized method for aligning a user's ischial tuberosities—which increases relative lordosis in the lumbar spine and pelvis venous outflow from the lower extremities, in a sitting position by decreasing venous obstruction and enhancing flow at the femoral vein level, novel seating products are achieved which are particularly amenable to installation in combination with conventional children's seating mechanisms, using seat cushions, inserts, or specialized plastic-related enhancements. Proper spinal alignment, growth and sustainable posture are further possible for developing systems according to the teachings of the present disclosure.

8 Claims, 4 Drawing Sheets

U.S. PATENT DOCUMENTS

| | | | |
|---|---|---|---|
| 4,718,727 A | | 1/1988 | Sheppard |
| 4,726,086 A | | 2/1988 | McEvoy |
| 4,819,288 A | | 4/1989 | Lowthian |
| 4,835,801 A | | 6/1989 | Walpin |
| 4,837,881 A | | 6/1989 | Kondo et al. |
| 5,000,515 A | | 3/1991 | Deview |
| 5,039,158 A | | 8/1991 | Maier |
| 5,114,209 A | | 5/1992 | Dunn |
| 5,163,737 A | * | 11/1992 | Navach et al. ......... 297/452.25 |
| 5,269,590 A | | 12/1993 | Carilli |
| 5,294,181 A | | 3/1994 | Rose et al. |
| 5,396,671 A | | 3/1995 | Stacy |
| 5,452,940 A | | 9/1995 | Maier |
| 5,522,106 A | | 6/1996 | Harrison et al. |
| 5,522,645 A | * | 6/1996 | Dahlbacka ............. 297/452.55 |
| 5,547,253 A | * | 8/1996 | Schwartz et al. ........... 297/338 |
| 5,553,924 A | | 9/1996 | Cantor et al. |
| 5,713,631 A | | 2/1998 | O'Neill |
| 5,855,415 A | | 1/1999 | Lilley, Jr. |
| 5,950,263 A | * | 9/1999 | Hanson et al. ................. 5/653 |
| 6,003,949 A | * | 12/1999 | Rinne et al. ........... 297/452.21 |
| 6,082,824 A | * | 7/2000 | Chow .................... 297/452.56 |
| 6,336,681 B1 | * | 1/2002 | Crosbie ................. 297/452.27 |
| 6,422,650 B1 | * | 7/2002 | Chien-Shen ................ 297/312 |
| 2002/0124318 A1 | | 9/2002 | Loomos |

OTHER PUBLICATIONS www.TimesOnline, New Car Seat Cuts Back Pain, Nov. 2, 2005.
www.FlightInternational, "Seat Designer Aims to Transfer Lotus Position", Aug. 11, 2005.
www.motoring.telegraph, "The Lotus Position", Oct. 3, 2005.
www.TimesOnline, "Lotus tries to cushion the blow of back pain while driving", Oct. 7, 2005.
www.racecar.com, "The ProBax Experience", Feb. 11, 2005.

* cited by examiner

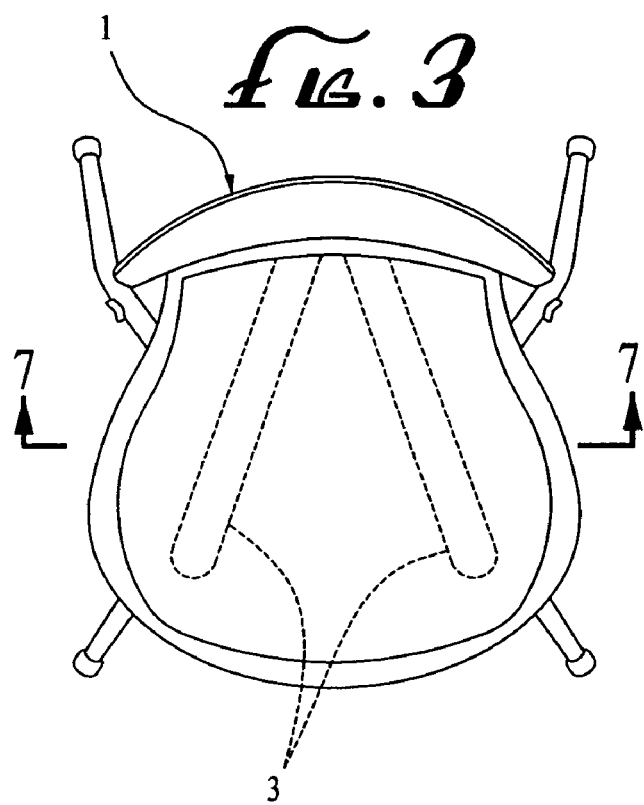
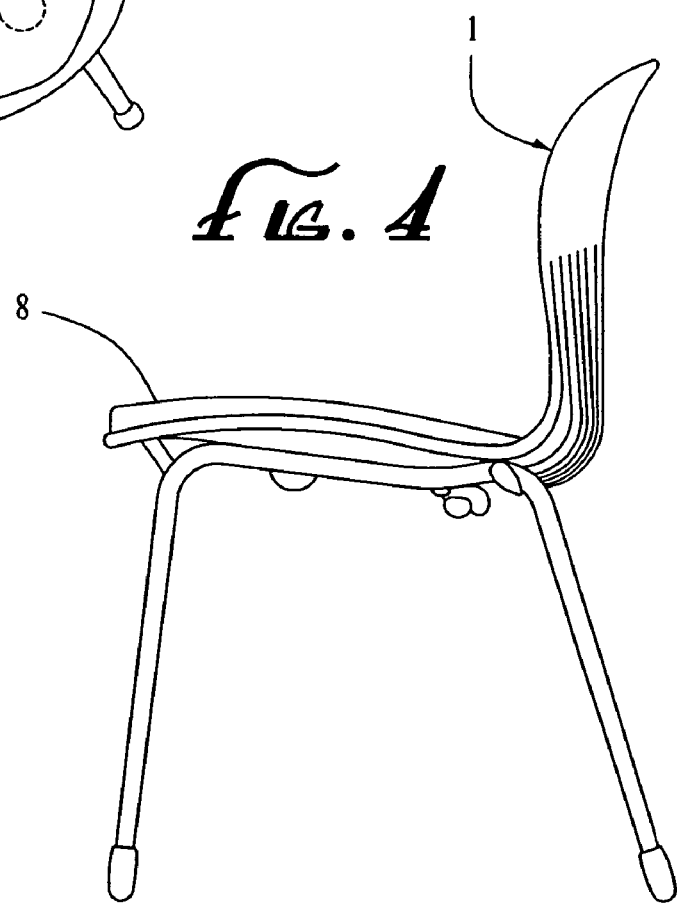

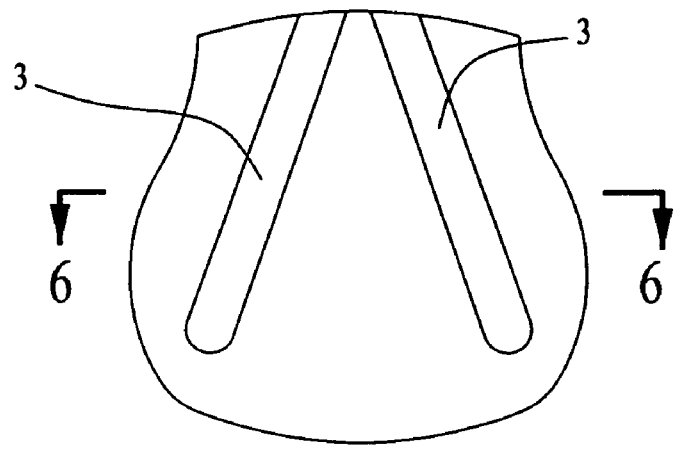
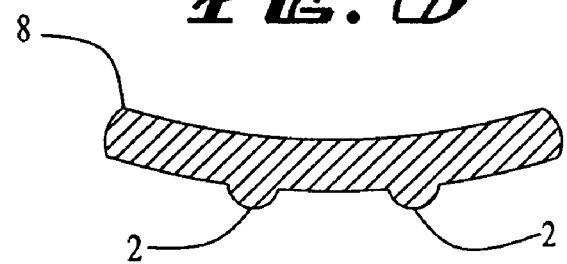
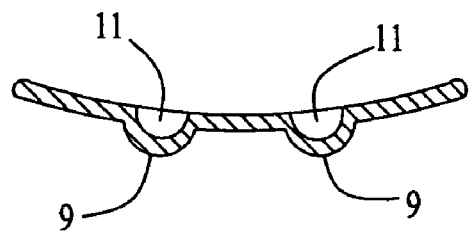
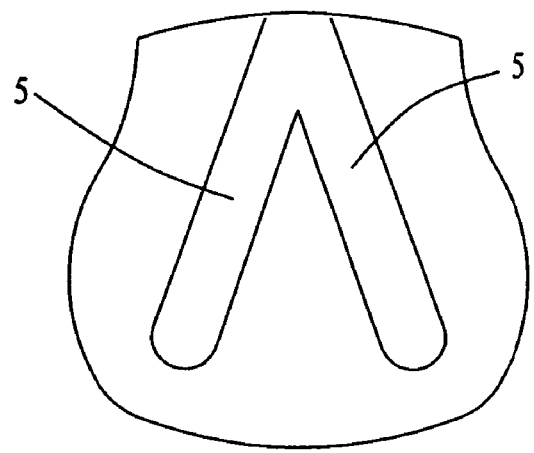

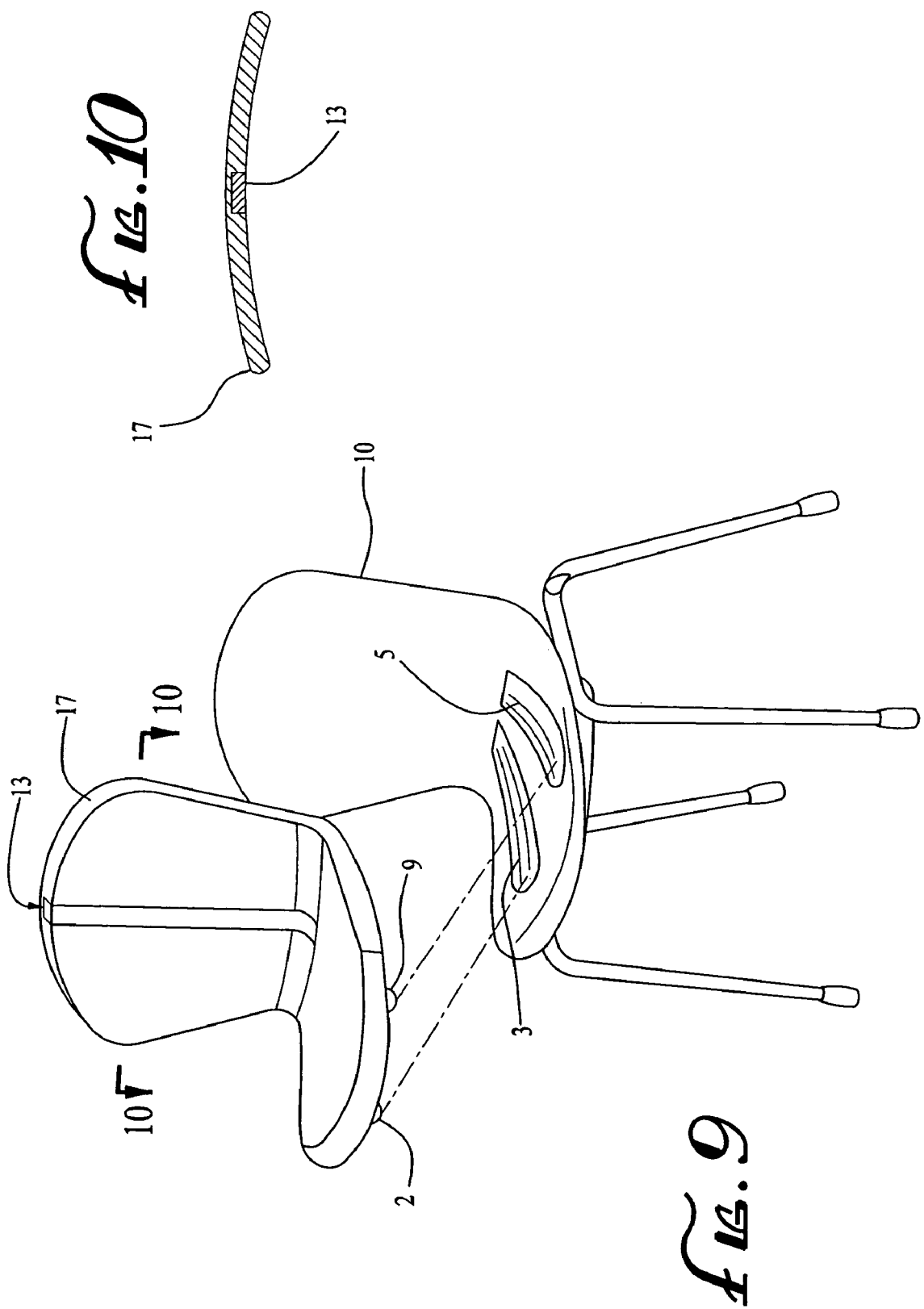

ENHANCED PROCESS FOR MAKING SEATING ELEMENTS AND PRODUCTS THEREBY INCLUDING THOSE SPECIALLY DESIGNED FOR CHILDREN

CROSS-REFERENCE TO RELATED APPLICATIONS

The present disclosure claims full Paris Convention Priority from, and reserves all rights under U.S. Provisional Application Ser. No. 60/579,134 filed Jun. 11 2004, by the same inventor. Likewise, priority is claimed from United Kingdom Patent Application No. GB•0425646.7 filed on Nov. 23, 2004 and PCT/GB2005/001644 filed on Apr. 29, 2005 by the current inventor.

FIELD OF THE DISCLOSURE

The present disclosure relates to seating elements, constructions and designs that improve functional posture. In particular, the present invention relates to methods for creating averaged or quasi-customized measurement systems which can improve postural elements of developing and developed spinal systems while increasing relative lordosis in the lumbar spine and pelvis venous outflow from the lower extremities by decreasing venous obstruction and enhancing flow at the femoral vein level.

The present disclosure generally relates to systems for making seats for school age children, but may be used both for any special needs group and the general populace. It is respectfully proposed that children garner significant benefits from the use of the disclosures of the present invention, which has been expressly commissioned by several organizations, including the British Government, for that purpose. On this basis, inter alia, it is respectfully requested that Letters Patent be granted for the reasons set forth in the instant specification and the claims appended hereto, and such relief is hereby earnestly solicited.

BACKGROUND OF THE DISCLOSURE

High technology seating systems have been known throughout history for providing comfort and support to those who sit in them. Seating systems designed for long-term usage, for usage by those with developing bodies and skeletal systems, for use by those engaged in higher stress sporting or athletic activities, those used in transport vehicles which may seat occupants for extended periods of time, and those for the physically challenged are likewise each a product of modern society. Since a paucity of solutions has become known, made or generally accessible—let alone commercially available, for each of these enumerated needs, and plethoric other challenges, the instant disclosure is offered for consideration as constituting progress in the fields of sciences and the useful arts.

In sum, conventional seating systems have yet to address using averaged or quasi-customized measurements to accommodate the spinal needs, and venous outflow requirements of users in combination with either developmental or special needs of users. The present inventor has discovered that by using ray-shaped chevron like elements with different densities, the seating of users can be used to impact their posture from the bottom up, solving future issues from alordosis various debilitating subluxation related challenges.

These issues and others are now managed by way of the present disclosure, as described in the specification herein and the claims which are appended hereto. Since the disclosure of the present invention addresses and ameliorates plethoric longstanding and unrequited needs it is believed to qualify as inventive subject matter.

SUMMARY OF THE DISCLOSURE

Briefly stated, by combining a wedged cushion and specialized methods for aligning a user's ischial tuberosities—which increases relative lordosis in the lumbar spine and pelvis venous outflow from the lower extremities, in a sitting position by decreasing venous obstruction and enhancing flow at the femoral vein level, novel seating products are achieved which are particularly amenable to installation in combination with any known seating systems, including conventional children's seating mechanisms, using seat cushions, inserts, or specialized plastic-related enhancements. Proper spinal alignment, growth and sustainable posture are further possible for athletically suited, challenged and developing systems according to the teachings of the present disclosure, which have been prototyped, tested and emplaced in a variety of seats for planes, cars, and sitting in class-rooms or offices for extended periods of time.

According to a feature of the present disclosure there is provided in a seating apparatus for preventing muscle fatigue and cushioning the spine to increase lordosis in the lumbar spine, the improvement which comprises, in combination, improving venous outflow from the lower extremities in the sitting position by decreasing venous obstruction at the femoral vein level, and, capturing an averaged distance measurement for a user's ischial tuberosities to optimize receiving pelvis weight bearing on each of the ischial tuberosities of the involved user.

According to the present invention there is likewise disclosed an improved apparatus for allowing a developing spine to grow without deleterious mechanical stresses by preventing muscle fatigue and cushioning the spine to increase lordosis in the lumbar spine, which comprises, in combination, a specialized seating assembly including a bottom cushion having ray-shaped chevron elements incorporated therein for improving venous outflow from the lower extremities in the sitting position by decreasing venous obstruction at the femoral vein level, and, the relative position and placement of the ray-shaped chevron elements is determined by capturing an averaged distance measurement for a user's ischial tuberosities to optimize receiving pelvis weight bearing on each of the ischial tuberosities of the involved user.

Further, incorporated expressly by reference as if fully set forth herein are U.S. Pat. Nos. 5,785,382; 6,447,058 and German OFFENLEGUNGSSHRIFT DE 198 50 226 A1.

BRIEF DESCRIPTION OF THE DRAWINGS

The present invention will be more clearly understood by reference to this specification in view of the accompanying drawings, in which:

FIG. 3 is a top view of the embodiment in FIG. 1, as seen through horizontal cross-sectional cut 7-7;

FIG. 4 is a side view of the embodiment in FIG. 1, as installed in a conventional children's chair;

FIG. 5 is a top view of an embodiment of the instant disclosure as seen through horizontal cross-sectional cut 6-6;

FIG. 6 is a cross-sectional view of the embodiment in FIG. 5;

FIG. 7 is a cross-sectional view of an embodiment of the instant disclosure;

FIG. 8 is a top view of another measured or quasi-customized embodiment of the disclosure of the present invention;

FIG. 9 is a partially exploded view of an embodiment of the instant disclosure; and, FIG. 10 is a cross sectional view of a top aspect of the embodiment of FIG. 9.

DETAILED DESCRIPTION

Figure 1:
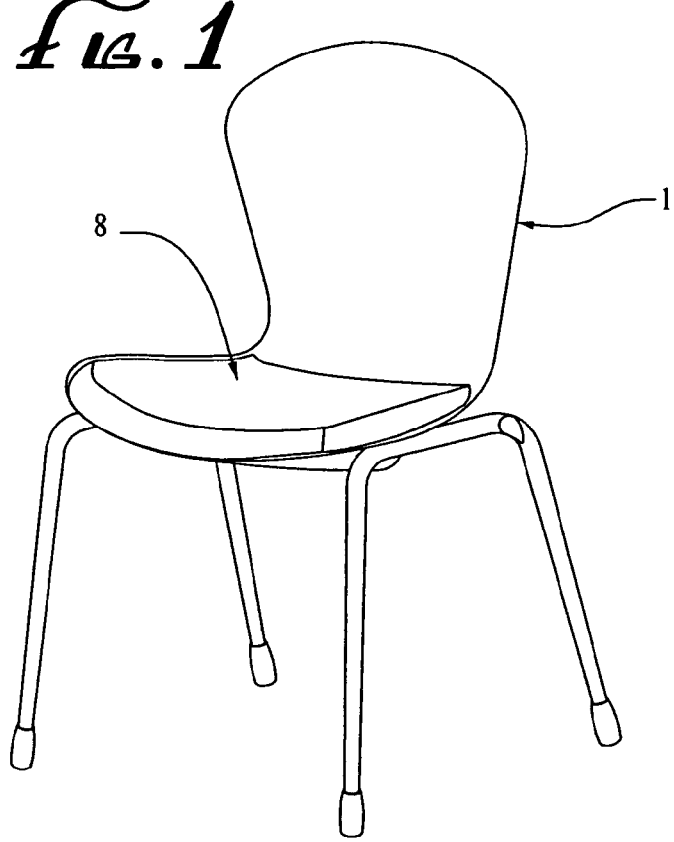
FIG. 1 is a view of an embodiment of an apparatus according to the present disclosure, as installed in a conventional children's chair.
Figure 2:
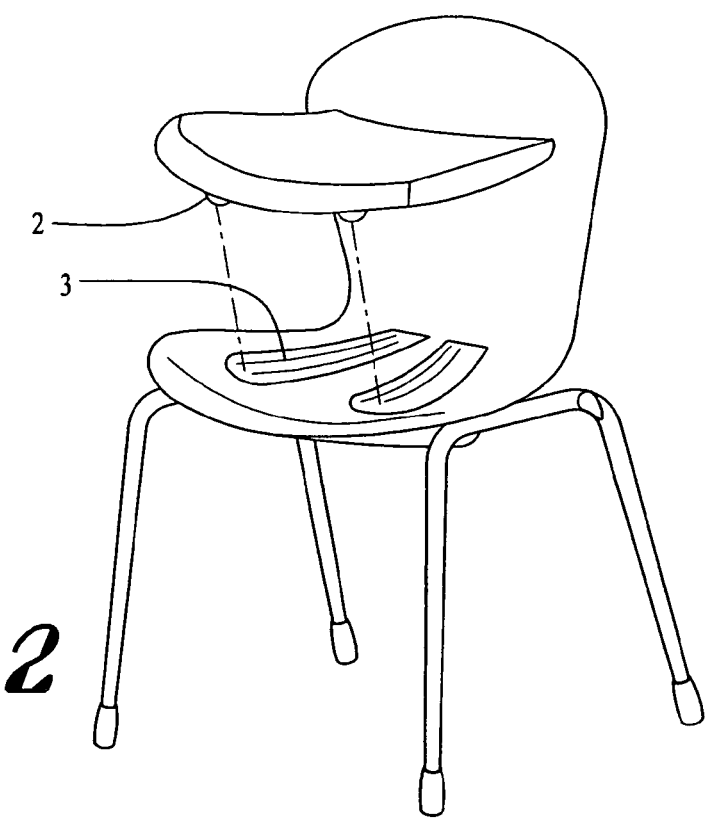
FIG. 2 is another partially exploded view of the embodiment of an apparatus according to the present disclosure, as installed in a conventional children's chair.

Referring to the drawings, FIGS. 1-4 and 9 show an embodiment of the disclosure 8 in situ, referred to herein as part of chair having incorporated improved seating apparatus 1, as it would appear in an installation configuration (as illustrated in FIG. 1 and FIG. 4) and according to at least one of the ways that the same may be installed in any conventional chair (as illustrated in FIGS. 2-4) and as being installed into chair 1 and FIG. 9.

FIG. 1 shows apparatus 8 as configured for installation into grooves 3, which are effective to receive ray-shaped chevron like projections 2, as disposed on a bottom side of apparatus 8. Mated engagement between each of the ray-shaped chevron like projections 2, is achieved in each groove 3, in FIG. 2. Referring also to Table 1, those skilled in the art will be familiar with dimensional aspects of these ray-shaped chevron like projections (reference designated as 2/9 and including inlays 11 optionally) will understand that their relative size is driven by the user's posterior sectional measurements. For example, children's chevrons could range from ¾ of an inch to 3 inches, depending upon the span between their ischial tuberosities.

FIG. 3 shows a top view including the underlying structure 3, to receive the ray-shaped chevron like projections 2. It is noted that empirical data has proven that a greater degree of lordosis in the spine increases venous outflow (see, for example, Senkowsky et al., A WEDGE SHAPED CUSHION IMPROVES MAXIMUM VENOUS OUTFLOW IN SEATED PATIENTS, abstract, in U.S. Application No. 60/579,134 filed Apr. 12, 2005, expressly incorporated herein by reference, from which priority is claimed in the instant disclosure), and according to the instant disclosure using this for chairs, for example for school age children, enables more comfortable seating and lower degrees of muscle fatigue. Over time, it is believed that this is helpful in delivering better posture, and pilot and proof of concept studies support this conclusion.

FIG. 4 likewise shows apparatus 8 installed in chair 1 from the side, and it is noted that a differential in firmness for the ray-shaped chevron like projections 2 (not shown) is responsible in significant part for achieving the required angles between a user's thighs and spine. Likewise, as discussed at length in the documents related to this filing the angles at which apparatus 8 is disposed relative to a plance defining a parallel to the surface upon which the chair sits are variable, depending upon the particular set of issues being addressed and ameliorated by the instant teachings.

Referring now to FIGS. 5-8, detailed views of embodiments of aspects of the subject cushions are seen in exploded views. Grooves, 3 and 5 respectively house projections 2 and 9, which may further comprise materials of alternate density, such as 11 in FIG. 7. This allows for variable durometer stiffness values to be used and as generally stated the stiffness of the ray-shaped chevron like projections is greater for most purposes. Various silicones, foams, gels, and those materials which would be within the ambit or artisans may be used for 11.

For the purpose of children's seat use, the following values have been established for use in calculating the distance between respective projection elements in the ray-shaped chevron like projections. Those skilled will understand how this relates to respective stiffness values in the involved seats, the width of said projection elements and the delta between them (as in FIG. 5, but not in FIG. 8). Table 1 summarizes raw data for this use. Likewise, adults and those with other challenges will have readily substitutable data sets that drive each of these respective values.

TABLE 1

| Age of Child | Mean Height | Mean Weight |
|---|---|---|
| 5-8 | 118 cm | 22 kg |
| 8-11 | 135 cm | 30 kg |
| 11-15 | 156 cm | 44 kg |
| 15-18 | 170 cm | 60 kg |

Likewise, FIG. 9 and FIG. 10 show an embodiment of the instant teachings with differential density channel 13, which may be softer in relative terms than the remainder 17 of seat 1. Either of the previously referenced orientations for the grooves 3 and 5 for ray-shaped chevron like projections may be used, namely as shown in FIG. 5 and in FIG. 8 the chevrons can be joined or separated at the apex of a triangle formed by an inner peripheral border of the same.

Referring once again to Table 1, those skilled in the art will be familiar with dimensional aspects of these ray-shaped chevron like projections (reference designated as 2/9 and including inlays 11 optionally) and will understand that their relative size is driven by the user's posterior sectional measurements, in combination with their height, weight and other consideration driven by the seating application in play. For example, children's chevrons could range from ¾ of an inch to 3 inches, depending upon the span between their ischial tuberosities, with adults having numbers likewise driven by the sum of their respective measurements, and skeletal elements in each required application of the teachings of the disclosure of the present invention.

The present invention provides an ischial tuberosity support apparatus which comprises a support member which is located within a seat base cushion and is arranged to support the ischial tuberosity set of a user so as to induce a forward tilt in the pelvis. In order to achieve this, viewing a typical seat base cushion in plain view, the support member should have a length and a width large enough to support the ischial tuberosities. In addition, the support member should be narrow enough such that it does not provide support to the muscular tissue surrounding the pelvis, in particular the gluteus muscles and hamstrings. In this manner, the muscular tissue is supported by the seat base cushion surrounding the support member and not by the support member itself.

The ray-shaped chevron like projections or support members can therefore be seen to assume a chevron-like shape. In disclosed embodiments, the position of a user on the seat base cushion when seated is determined largely by the interaction between the user's back and the back support. For any given user, if their back is aligned with the back support, their ischial tuberosity will take up a certain position on the base cushion.

In general terms, the larger the user, the larger the gluteus muscles and hence the further forward on the seat base cushion their ischial tuberosity set will be positioned. In addition, the larger the user the further apart the ischial tuberosity protrusions will be. To accommodate this, the support members are further apart toward the front of the base cushion than they are towards the rear of the base cushion.

Likewise, and referring back to schematic FIG. 5 and FIG. 8, the gap or delta between respective projections of the ray-shaped chevron like projections/support members have been made in the at least two configurations illustrated. Those skilled in the art will understand that this is an illustrative, not limiting design driven by the functional needs of the present disclosure.

The actual dimensions of the support members are based on the average distance between the ischial tuberosity set of a group of users selected from a cross-section of the population. In this regard, it will be appreciated that the above measurements (see Table 1) are but one example of an ischial tuberosity support apparatus in accordance with the present invention and that a range of shapes and sizes may achieve the same effect. For children's seating needs, it is readily understood that smaller dimensional issues are appropriate and that is why they have been used for the purpose of the instant specification, related data sets for different groups of targeted users are expressly contemplated within the scope of the instant disclosure.

An arrangement for the ischial tuberosity support apparatus which is large enough to provide support to the ischial tuberosity set of a group of users, while being narrow enough to properly support the ischial tuberosity set, avoiding support of the surrounding muscular tissue is an object of the instant teachings. This arrangement has the added advantage of reducing pressure to the gluteus muscles and hamstrings of a user while seated.

When seated, the weight of the user's upper body is normally largely taken by the hamstrings and the gluteus muscles. Much of the weight is transferred through the user's spine and pelvis. Supporting the ischial tuberosities also has the effect of reducing the weight taken by the hamstrings and gluteus muscles. Allowing a child's spine to be properly supported in this context has likewise been observed to mitigate the need to constantly adjust position, or to "squirm" in a chair attempting to re-position ones' self to achieve a more comfortable position, posturally.

Referring now to FIGS. 9 and 10, by providing better support within the seat base cushion the user's pelvis is not allowed to slump into the seat which helps prevent slump in the spine. However, an important improvement and established advantage associated with this embodiment is realized by the support member 13. Support member 13 may have a variable durometer relative to the rest of the seat, depending upon the specific application in play. The support member supports the ischial tuberosities while the muscular tissue surrounding the pelvis is allowed to slink into the seat base cushion. The sloping surface of the support member induces a forward tilt in the pelvis. In addition, pressure is take off the gluteus muscles and hamstrings which leads to increased venous flow, has now been empirically proven to reduce the likelihood of DVT (deep vein thrombosis) and all of the attendant harms that have become both scientifically and anecdotally associated with the condition, including for those users riding on planes, trains and in automobiles for extended periods of time.

The invention claimed is:

1. In a seating apparatus for preventing muscle fatigue and cushioning the spine to increase lordosis in the lumbar spine, the improvement which comprises, in combination:

a wedge-shaped cushion having a top and a bottom, whereby the top is substantially planar parallel to a surface upon which the seating apparatus stands, and a bottom which houses two projecting members each in the geometric configuration of a ray whose vertex is at a back portion of the seating apparatus, which abuts a user's back when seated for improving venous outflow from the lower extremities in the sitting position by decreasing venous obstruction at the femoral vein level; and using parameters including a distance measurement for a user's ischial tuberosities to optimize receiving pelvis weight bearing on each of the ischial tuberosities of the involved user by altering the relative orientation of the two projecting members each in the geometric configuration of a ray whose vertex is at the back portion of the seating apparatus.

2. The apparatus of claim 1, wherein the parameters further comprise height and weight ranges of prospective users.

3. The apparatus of claim 2, wherein at least one of the parameters is garnered from a pre-existing data set.

4. The apparatus of claim 2, wherein at least one of the parameters is based upon values averaged, or otherwise statistically sampled for manufacturing purposes.

5. The apparatus of claim 4, wherein the optimization is based upon an algorithm.

6. The apparatus of claim 2, wherein at least one set of data points is customized to a particular user.

7. The apparatus of claim 6, wherein the optimization is based upon an algorithm.

8. In a seating apparatus for preventing muscle fatigue and cushioning the spine to increase lordosis in the lumbar spine, the improvement which comprises, in combination:

a wedge-shaped cushion having a top and a bottom, whereby the top is substantially planar parallel to a surface upon which the seating apparatus stands, and a bottom which houses two projecting members each in the geometric configuration of a ray whose vertex is at a back portion of the seating apparatus, which abuts a user's back when seated for improving venous outflow from the lower extremities in the sitting position by decreasing venous obstruction at the femoral vein level; and the relative position and placement of the two projecting members is determined by capturing a distance measurement for a user's ischial tuberosities to optimize receiving pelvis weight bearing on each of the ischial tuberosities of the involved user.

\* \* \* \* \*